United States Patent [19]

Lofton

[11] Patent Number: 4,919,232

[45] Date of Patent: Apr. 24, 1990

[54] COLD LUBRICANT MISTING DEVICE AND METHOD

[76] Inventor: Hugh Lofton, 3565 Linden Ave. #347, Long Beach, Calif. 90807

[21] Appl. No.: 351,440

[22] Filed: May 12, 1989

[51] Int. Cl.$^5$ ............................................. F01M 1/00
[52] U.S. Cl. ...................................... 184/6.26; 407/11
[58] Field of Search ................ 184/6.26; 407/11; 62/5

[56] References Cited

U.S. PATENT DOCUMENTS

| | | | |
|---|---|---|---|
| 1,824,540 | 9/1931 | Gronkwist | 184/6.26 |
| 2,737,028 | 3/1956 | Machlanski | 62/5 |
| 3,605,551 | 9/1971 | Steward | 407/11 |
| 4,322,189 | 3/1982 | Briese | 407/11 |
| 4,458,494 | 7/1984 | Fekete | 62/5 |

FOREIGN PATENT DOCUMENTS 155151  5/1956  Fed. Rep. of Germany ............ 62/5

*Primary Examiner*—Carroll B. Dority
*Attorney, Agent, or Firm*—Fulwider Patton Reiber Lee & Utecht

[57] ABSTRACT

A method and device for lubricating a workpiece-machine tool interface during a machining operation in which the temperature of lubricant atomized within a stream of air is substantially reduced. The preferred embodiment utilizes a vortex tube to accomplish the cooling and thereby provides an extremely simple device that greatly reduces the amount of heat generated in a machining operation. Reduced heat production decreases the temperatures to which both the workpiece and machine tool are subjected. Lower temperatures serve to extend the machine tool's service life while preserving the workpiece's metallurgy and consequently allows for increased machining rates.

8 Claims, 1 Drawing Sheet

COLD LUBRICANT MISTING DEVICE AND METHOD

BACKGROUND OF THE INVENTION

The present invention relates to lubricant devices and methods and more particularly pertains to an apparatus and method for significantly extending machine tool service life. The apparatus and method of the present invention are adaptable to various machining operations including, but not limited to drilling, cutting, reaming, tapping, boring, routing and milling.

Heat generated during the above mentioned machining operations is both detrimental to the workpiece as well as to the machine tool. Excessive heat can cause metallurgical changes within the workpiece while accelerating the wear and dulling of the tool. A dull tool is less effective, generates even more heat during use, and thereby accelerates its own deterioration and ultimate failure. Backing off on the machining rate decreases the amount of heat generated, but results in a slower and less efficient production throughput.

The undesirability of excessive heat build-up associated with machining operations has long been recognized and efforts to reduce temperature generally fall into two categories. The workpiece and machine tool are either cooled or their interface is lubricated. Supplying a cooling fluid either at ambient or subambient temperatures serves to reduce temperatures by transporting away heat generated during the machining operation. Alternatively, lubricating the machining surface reduces the amount of heat actually generated without compromising the effect of the tool on the workpiece. Flooding the workpiece and machine tool with copious amounts of lubricant would suggest that both effects are achieved simultaneously. The lubricant serves to reduce friction and hence heat generation at the outset as well as reduce the resulting temperature by transporting away heat that is generated. A particularly effective variation on this basic theme includes finely dividing or atomizing the lubricant into a mist (see for example, U.S. Pat. Nos. 3,188,010 and 3,939,944) to provide more surface area, and hence achieve a more efficient heat exchange.

Disadvantages associated with prior art devices are generally attributable to the overall effectiveness of a particular method or device. Regardless of the amount of coolant supplied or the amount of lubricant applied, an increased machining rate will ultimately be attained wherein the machine tool and workpiece suffers and throughput efficiency must be forfeited. In addition, the disposal or recycling of toxic or contaminated cooling or lubricating compositions can pose a problem in modern pollution-conscious industrial settings.

A method and apparatus applying such a method is therefore called for that more efficiently reduces the production or build-up of heat during a machining operation and that preferably generates reduced amounts of waste material.

SUMMARY OF THE INVENTION

The present invention provides a lubricating method that significantly reduces the amount of heat evolved during a machining operation. Application of this method, or utilization of the device employing this method greatly extends a machine tool's service life and enables increased machining rates to be achieved without adversely effecting the metallurgy of the workpiece nor the sharpness of the tool. The present invention achieves this by supplying a substantially cooled mist of lubricant to the workpiece-machine tool interface.

This method has proven much more effective than either cooling alone or lubrication alone and is actually more effective than what an arithmetic combination of cooling methods and lubrication methods would suggest. It is, therefore, theorized that only substantial cooling of the lubricant allows the lubricant to actually reach the workpiece-machine tool interface where it is then able to reduce friction, and hence, reduce heat evolution. At high machining rates uncooled lubricant is simply boiled off before it reaches the interface and the violent outgassing, as a result of the sudden change of state the lubricant undergoes, serves to sweep away incoming fresh lubricant. This phenomenon is present even when a workpiece and machine tool is flooded with copious amounts of lubricant at substantially ambient temperatures as the actual interface, when viewed on a microscopic level remains clear of lubricant due to the sweeping effect of the violently expanding lubricant as it changes into its gaseous state. At high machining rates, in effect, neither conventional cooling means nor conventional lubrication means actually serve to lubricate the workpiece-machine tool interface to prevent or reduce the amount of heat generated at the outset. In actuality, heretofore methods applied to high feedrate machining operations have merely served to transport heat away once generated.

The method of the present invention additionally serves to reduce the total amount of lubricant consumed due to its more efficient exploitation thereof.

In a device employing the above-described method of the present invention, a pressurized stream of air is cooled substantially below ambient temperature after which lubricant is introduced thereinto at a controlled rate. Upon introduction into the cold air stream, the lubricant is atomized and its temperature is substantially reduced. The resulting cooled lubricant mist is subsequently directed at the workpiece-machine tool interface. Provisions are included to fine-tune flow rates as well as the resulting temperature of the mist, and additionally adaptation of a programmable metering unit permits lubricant to be introduced into the stream only when actually needed at a rate tailored to a particular type of machining operation and a particular machining rate.

Other features and advantages of the present invention will become apparent from the following detailed description, taken in conjunction with the accompanying drawing, which illustrate, by way of example, the principles of the invention.

DETAILED DESCRIPTION OF THE INVENTION

Figure 1:
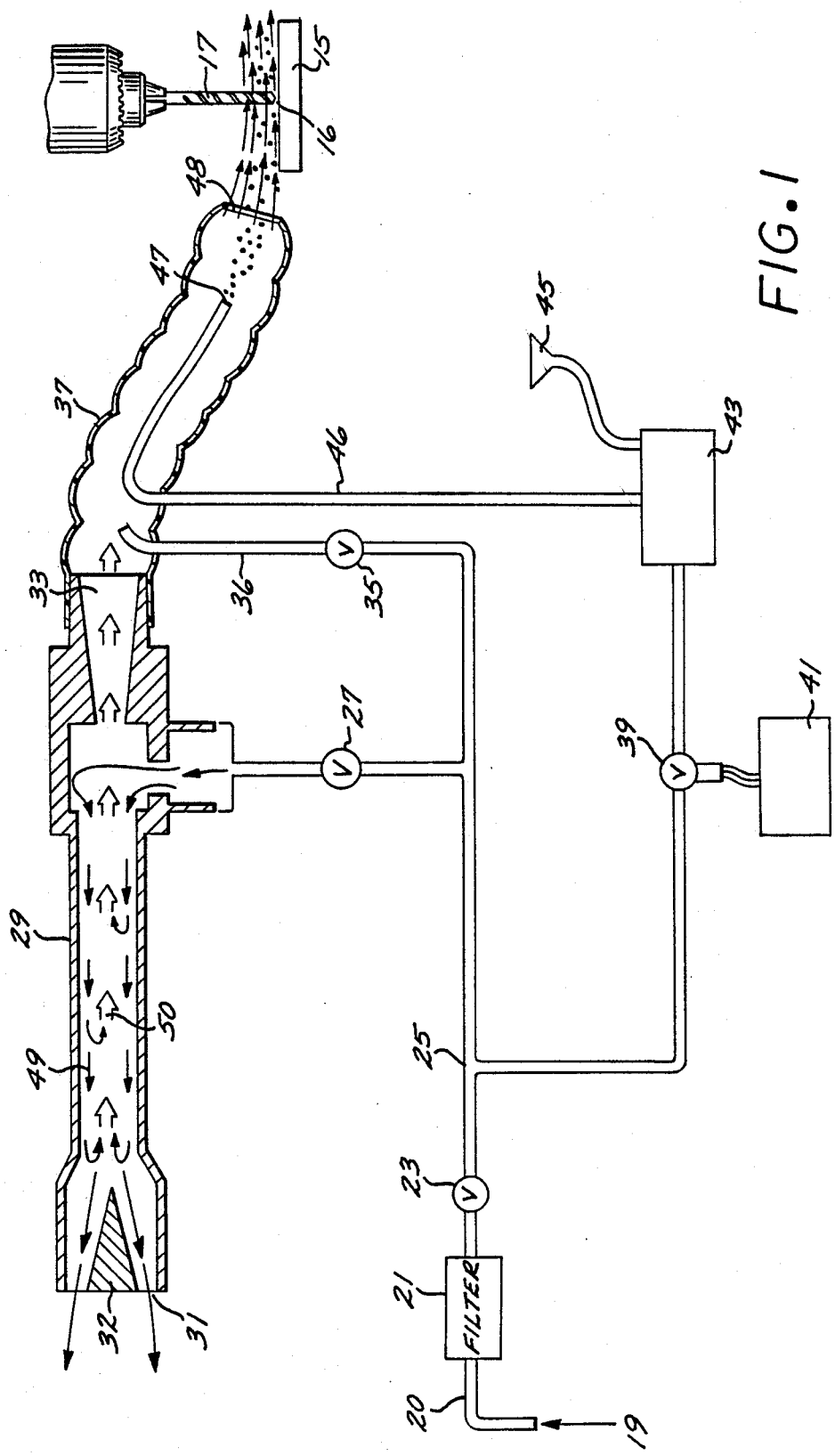
FIG. 1 is a schematic representation of an apparatus employing the method of the present invention.

Generally, the method of the present invention provides a mist of cold lubricant to a workpiece-machine tool interface. More specifically, this method comprises introducing lubricant into a fast moving stream of cooled air and then directing the resulting mixture at the workpiece-machine tool interface during a machining operation. The introduction of the lubricant into the fast moving cold air stream has the effect of first atomizing the lubricant into a fine mist and then cooling the lubricant particles down to a preselected subambient temperature. It has been found that only substantially cooled lubricant is able to actually reach a workpiece-machine tool interface during high rate machining operations where its lubricating properties can then be exploited to reduce the amount of heat generated. Uncooled lubricant merely boils off to its ineffective gaseous state and the commensurate expansion it undergoes during this change of state actually serves to sweep away additional incoming lubricant.

The FIGURE illustrates a preferred embodiment of the invention wherein the illustrated apparatus employs the above described method to reduce the amount of heat generated by a machining operation in which a machine tool 17 engages a workpiece 15. For the purposes of this particular illustration, the machine tool 17 comprises a drill bit while the workpiece 15 constitutes a billet.

Pressurized air from a source (not shown) is introduced into pressure line 20 at 19 and is initially filtered through an inline filter 21 to remove any potentially harmful contaminants. Valve 23 controls the amount of air passing through line 20, while valve 27 controls the airflow introduced into the cooling unit 29. In the preferred embodiment, the cooling unit 29 takes the form of a vortex tube, more formally referred to as a Hilsch Tube or Ranque-Hilsch Tube, which, without the use of any moving parts, produces a flow of warm air from its hot air orifice 31 and a flow of cooled air from its cold air orifice 33. An adjustable valve 32 located at the hot air orifice 31 controls the ratio of hot air to cold air expelled from the orifice. A flexible conduit 37 conducts the cold air issuing from the cold air orifice 33 towards the workpiece-machine tool interface 16.

The pressure line 20 is tapped at junction 25 to provide pressurized air to lubricant pump 43 which introduces a precisely metered amount of lubricant into outgoing line 46 at a function of the incoming air flow. A computer 41 controlled solenoid valve 49 regulates the airflow that actually reaches the metering pump.

This diverted and regulated airflow serves to both prompt the introduction of lubricant into line 46 and additionally transport the lubricant to its discharge end 47. The lubricant tube 46 is introduced into and then coaxially routed within the flexible conduit 37 to a point a short distance from its mouth 48.

An additional airline 36 allows uncooled air to be introduced into the Hilsch Tube 29 near its cold end. Valve 35 controls the amount of air injected into the Hilsch Tube 29 at this location.

The unexpected effects of application of the methods of the present invention can be achieved through the combination of the few and rather simple components illustrated in the FIGURE. In its operation, it is to be pointed out that a single source of pressurized air is employed to fulfill a multitude of different functions simultaneously. The pressurized air flowing through the Hilsch Tube 29 produces, without external power demand, a low temperature fraction which subsequently serves to lower the lubricant mist's temperature. The air stream flowing past the lubricant tube's 46 discharge end 47 serves to first atomize the lubricant into fine particles and then transport the resulting mist to the workpiece-machine tool interface 16. In addition, airflow routed to the lubricant pump 43 first prompts the dispensation of lubricant into line 46 and then transports it to the discharge end 47. The use of a Hilsch Tube 29 provides an extremely simple, reliable and foolproof means of providing a flow of cold air. The interior of the Hilsch Tube consists of a number of precisely oriented and dimensioned passages which induce two counter rotating vortices 49, 50 within the tube to interact with one another to ultimately produce the two emitted air flows at the high and low temperatures. A control valve 32 controls the ratio of the hot air to cold air and can be adjusted to tailor the resulting temperature and flowrate to a particular machining operation. A Hilsch Tube supplied with 8-15 cfm at 80-110 psi is capable of providing a cold fraction down to 135° F. below ambient temperature and is capable of maintaining such temperature within 1° F. A larger cold air fraction is obtainable with less temperature reduction. A Hilsch Tube properly adapted for this application is no longer than 8" in length, is inexpensive and utterly reliable.

Lubricant introduced into line 46 is coaxially routed within conduit 37 to point 47, located a short distance from the conduit's mouth 48. Particular attention must be paid to the routing of the line 46 within conduit 37. Because the rheological properties of the lubricant change as a function of temperature and more particularly, because typically, viscosity increases as temperature decreases, it is important that the lubricant's temperature is reduced once in its mist form in conduit 37 between 47 and 48 and beyond, as opposed to while still in bulk within conduit 46. A premature reduction of the lubricant's temperature can restrict flow or even cause a blockage within line 46. Consequently, the length of line 46 within conduit 37 must be limited accordingly, or alternatively, adequately insulated. The additional airline 36 allows uncooled air to be introduced into conduit 37 and thereby allows the temperature to be fine tuned without resort to the gross adjustment available by resetting of valve 32.

The introduction of the lubricant at 47 into the high velocity flow of cold air serves to atomize the lubricant and thereby produces a mist of particles of lubricant which can then easily be directed towards the workpiece machine tool interface. Additionally, formation of the mist substantially increases the lubricant's surface area thereby promoting accelerated heat exchange with the cold air stream. A variety of different types of lubricant are available and can be dispensed by the described apparatus. Different machining operations or materials to be machined require different types of lubricant. Such lubricants can consist of any of a variety of formulations, including, but no limited to, various oils, greases, water soluble hydrocarbons, synthetics, glycerols and alcohols.

Controller 41 controls the activation of solenoid 39 which then permits pressurized air to enter the lubricant pump 43 at a precise rate and timing sequence. Controller 41 may be programmable to tailor the rate of dispensation of a particular type of lubricant to a particular machining operation and can additionally be directly linked to the machine tool so as to provide lubricant only when the machine tool is actually in contact with the workpiece. Alternatively, the controller may be controlled by a manual override. Lubricant pump 43 meters the amount of lubricant actually introduced into the air stream as a function of the flow of air by the solenoid valve.

EXAMPLE

The following empirical observations serve to demonstrate the efficacy of the method of the present invention.

The machining operation comprised drilling a 0.140" hole through ½" thick hardened stainless steel (Rockwell number C36/40). The machine tool consisted of a high-speed Cleveland Twist drill bit, with a 135° point angle.

By flooding the workpiece machine tool interface with coolant (Petroleum based water soluble), a total of 20-40 holes were drilled at a preselected constant rate prior to deterioration of the drill bit. In addition to the early deterioration of the tool, the workpiece showed burr marks, chatter marks and discoloration.

By directing a stream of cold (40° F.) air at the workpiece machine tool interface, 50-80 holes were drilled at the identical rate prior to complete deterioration of the drill bit. Similar flaw marks on the workpiece were observed.

Directing lubricant (Acculube or Boelube) at ambient temperatures towards the workpiece machine tool interface slightly extended machine tool service life to about 80-100 holes prior to failure.

A cooled lubricant mist (Acculube or Boelube, 40° F.) produced in accordance with the present invention yielded the astounding results of extending machine tool service life to 200-500 holes prior to failure at twice the feedrate. No burn marks or chatter marks were visible on the workpiece and no heat discoloration was observed.

While a particular form of the invention has been illustrated and described it will also be apparent that various modifications can be made without departing from the spirit and scope of the invention. Accordingly it is not intended that the invention be limited, except as by the appended claims.

What is claimed is:

1. In a machining operation in which a machine tool engages a workpiece, a method for reducing heat generated thereby, comprising the steps of:
   cooling an airstream substantially below ambient temperature;
   introducing lubricant into said cooled airstream at a controlled rate, whereby said lubricant is first atomized to form a fine mist and then cooled to a subambient temperature;
   directing said cold lubricant mist toward the workpiecemachine tool interface.

2. The method of claim 1 wherein a vortex tube is employed to cool the airstream substantially below ambient temperature.

3. The method of claim 2 wherein a programmable metering unit is employed to introduce lubricant into said cooled airstream at a controlled rate tailored to a particular machining operation.

4. An apparatus for providing a mist of cooled lubricant to a workpiece-machine tool interface for reducing heat generated by a machining operation, comprising;
   means for transporting said cooled lubricant mist towards such workpiece-machine tool interface during such machining operation.

5. The apparatus of claim 4 further comprising a vortex tube for producing said stream of cold air.

6. The apparatus of claim 5 further comprising a programmable metering unit for controlling the rate at which lubricant is introduced into said stream of cold air whereby said rate can be tailored to a particular machining operation.

7. An apparatus for providing a mist of cooled lubricant to a workpiece-machine tool interface for reducing heat generated by a machining operation, comprising:
   a supply of pressurized air;
   a vortex tube, supplied with said pressurized air and configured to provide a stream of cold air issuing therefrom;
   a conduit for conducting said stream of cold air towards such workpiece-machine tool interface;
   a lubricant line for introducing lubricant into said conduit conducting said stream of cold air whereby said lubricant is atomized and cooled upon introduction there into; and
   a means for controlling the rate at which lubricant is passed through said lubricant line and introduced into said stream of cold air.

8. The apparatus of claim 7 wherein said means for controlling the rate at which lubricant is passed through said lubricant line comprises a programmable metering unit whereby the rate of introduction can be tailored to a particular machining operation.

* * * * *